United States Patent [19]

Yamazaki et al.

[11] Patent Number: 4,682,221
[45] Date of Patent: Jul. 21, 1987

[54] NON-CONTACT ELECTRO-OPTICAL DISPLACEMENT FOLLOWER

[75] Inventors: Iwao Yamazaki; Yuji Nakamichi; Keizo Abe; Tatsuya Okudera, all of Tokyo, Japan

[73] Assignee: Ya-man Ltd., Tokyo, Japan

[21] Appl. No.: 668,878

[22] PCT Filed: Mar. 14, 1984

[86] PCT No.: PCT/JP84/00104
§ 371 Date: Oct. 31, 1984
§ 102(e) Date: Oct. 31, 1984

[87] PCT Pub. No.: WO84/03762
PCT Pub. Date: Sep. 27, 1984

[30] Foreign Application Priority Data

Mar. 15, 1983 [JP] Japan .................................. 58-41555
Mar. 31, 1983 [JP] Japan .................................. 58-53735

[51] Int. Cl.⁴ .............................................. H04N 7/18
[52] U.S. Cl. ...................................... 358/107; 358/125; 250/203 CT
[58] Field of Search ................. 358/107, 93, 125, 126, 358/108; 250/203 CT

[56] References Cited

U.S. PATENT DOCUMENTS

| | | | |
|---|---|---|---|
| 3,402,298 | 9/1968 | Janeway | 358/125 X |
| 3,495,087 | 2/1970 | Starer | 358/125 X |
| 3,571,567 | 3/1971 | Eckermann | 250/203 CT X |
| 3,593,286 | 7/1971 | Altman | 250/203 CT X |
| 3,651,326 | 3/1972 | Alpers | 250/203 CT |
| 3,780,223 | 12/1973 | Perry | 358/126 X |
| 3,816,648 | 6/1974 | Noll et al. | 358/126 X |
| 3,923,273 | 12/1975 | Alpers | 250/203 CT X |
| 3,943,277 | 3/1976 | Everly et al. | 250/203 CT X |
| 4,297,725 | 10/1981 | Shimizu et al. | 358/125 |

FOREIGN PATENT DOCUMENTS 0013454 2/1978 Japan.
0157104 9/1982 Japan.

Primary Examiner—James J. Groody
Assistant Examiner—Victor R. Kostak
Attorney, Agent, or Firm—Kane, Dalsimer, Kane, Sullivan and Kurucz

[57] ABSTRACT

This invention relates to a non-contact electro-optical displacement follower which captures the image of a target or device under test optically, converts the said image into an electron image by optical-electrical conversion, and measures displacement. It forms a variable voltage which moves the electron image on the displayer to the desired location and can be applied to each deflection coil (8, 9) by arranging a variable voltage generator (18h, 18v) attached to each deflection coil so that the set-up and adjustment of the equipment and measurement preparations can be performed easily. Moreover, this equipment possesses a displayer (A1, A2, A3, A4) to indicate which position (up, down, right or left) the electron image moved due to the variable voltage, in spite of the fact that the electron image may be damaged temporarily if adjustment is excessive. Additionally, a non-contact electro-optical displacement follower of this invention can be equipped with a Light Servo circuit (27, 28) whose frequency response will eliminate effectively any optical noise changing in high speed. It also comes equipped with operation instructions to advise operators directions for each mode the equipment is in, as well as the mode to follow (KD, CPU, I).

8 Claims, 36 Drawing Figures

FIG. 2
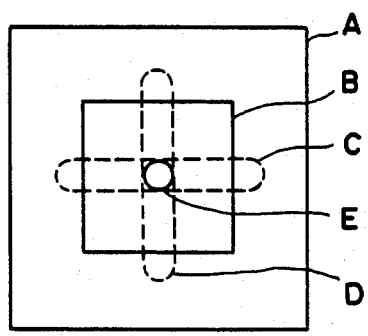
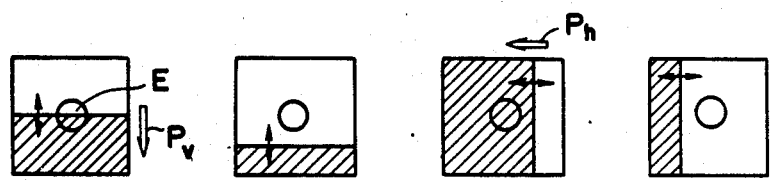
FIG.3a   FIG.3b   FIG.3c   FIG.3d

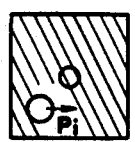 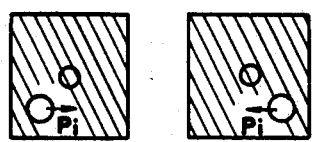 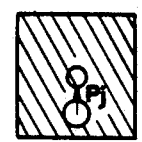 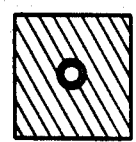
FIG. 4a    FIG. 4b    FIG. 4c    FIG. 4d
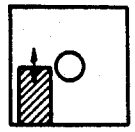  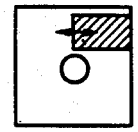 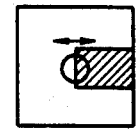
FIG. 5a    FIG. 5b    FIG. 5c    FIG. 5d FIG. 16
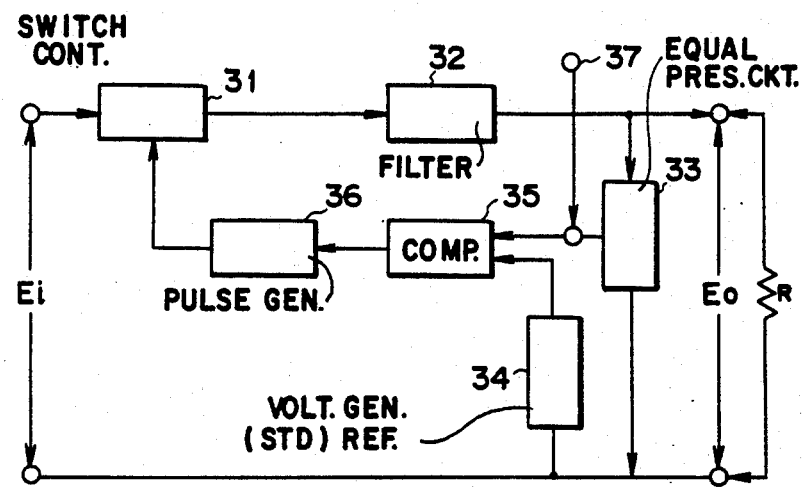
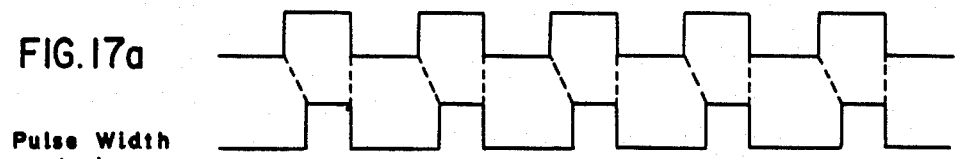
FIG. 17a
Pulse Width control
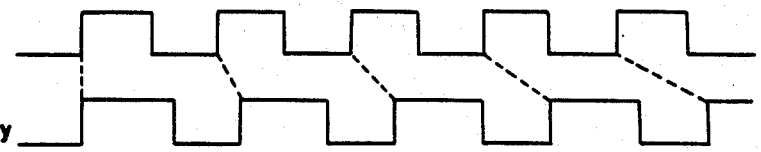
FIG. 17b
Pulse Frequency control
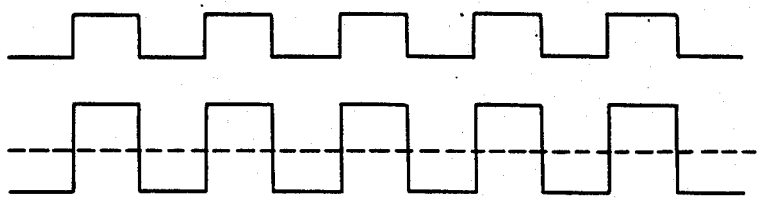
FIG. 17c
Pulse Amplitude control

NON-CONTACT ELECTRO-OPTICAL DISPLACEMENT FOLLOWER

TECHNICAL FIELD

This invention relates to a non-contact electro-optical displacement follower, which captures microscopic displacement of the part under test optically and measures it in a non-contact mode.

BACKGROUND TECHNIQUE

A non-Contact Electro-optical Displacement follower measures displacement by electrically processing a target image of the part under test which has been captured optically and converted into an electrical image. As this kind of equipment can measure displacement without actually coming into contact with the object being measured, one can measure high speed displacement, microscopic displacement, etc. from a set distance accurately, without having any effect upon the operation of the part which is displaced. The equipment can thus be used in various fields, such as research, experiment, manufacturing, test, etc., because of its ability to measure the displacement by merely capturing the displacement part optically without obstructing the operating state, no matter what the shape of the displaced part.

Concerning conventional non-contact electro-optical displacement followers, it was often necessary to move the target or the measuring equipment (camera) when for some reason the optical image of the part under test had to be moved beyond the range within which the above image was captured and that measurement or adjustment could be carried out. However, in general, neither could be easily moved without disrupting the experiment, as the part to be measured would easily fall out of sight. It is very time consuming to move a camera each time the displacement measurement the purpose of which is to measure microscopic movements is carried out. Moreover, it becomes difficult to obtain the measurement data maintaining the reliability and reproducibility and it is against the demand of quick and precise displacement measurement.

The most conventional equipment used an analog output to display the amount of displacement e.g. moving coil meter. With this system there was no way to display a warning to inform when the target's light-/dark boundary was out of the measurable field even by a small amount. This was because the measurable field of the equipment was often small in proportion to the field which optically captures the light/dark target which is the device under test. In order to compensate for this defect, a system was adapted that connects the system in parallel, to an oscilloscope, and confirms the signal from the measuring equipment on a CRT. However, using this method, it is impossible to confirm whether the relative deflection between the target and the measuring equipment is beyond the fixed range or not. Also when using this kind of displacement follower, the measurement mode needs to be set up, according to the amount of light/dark of the target. If this is not set up correctly, measurement can not be carried out, because there will be an incorrect operating display.

In this case, the operator is forced to manually view the target, or change the mode setting by sighting again the target. In equipment used to measure the microscopic or short time displacement, conditions which require a lot of readjusting of the camera should be avoided, as well as those where individual operators ability will make a difference in the results.

When carrying out non-contact electro-optical displacement measurements, one must set up the target properly. Also displacement can not be measured accurately unless each operational step such as setting of camera and other measuring equipments, initial adjustment and the following modifications are carried out carefully, and meticulously. Accuracy naturally depends on how well the system has been initially set up, and subsequently, how carefully the modification operations are carried out. This was regarded as being complicated for beginners, since these operations required skill and intuition due to their complex construction and operating requirements. This was especially true when other measurement equipment or optional functions such as operation processing equipment was added to it.

In displacement measurement using the non-contact electro-optical displacement follower, there was sometimes the problem that the change of the position of light emitted or reflected from the target was taken as change of position of the target. Brightness caused the target to change its amount of reflection, and the deflection current inside the measuring equipment would automatically compensate for this change. This decreased the accuracy, as the read out would indicate that displacement had occurred. Accordingly the best way to perform an accurate displacement measurement is to irradiate a constant source of illumination on the target and make sure not to change the brightness of the target. This did not solve the problem of what to do to compensate for this problem when measuring outdoors, or when measuring large units, because it was impossible to disregard the amount of sunshine or the presence of interference light.

To eliminate this problem, what is known as the "Light Servo system" came into use. The system can detect any change of light, and subsequently compensate for this in the measurement results, thus allowing accurate measurement of displacement.

The Light Servo System forms a "Servo Loop Circuit" which changes the high voltage for electron acceleration according to the quantity of incident light using a photoelectric conversion system, and subsequently accounts for the influence of the interference light. However, the high voltage power supply can only maintain the output voltage constant and thus the frequency response of the servo system is apt to be low. The system is effective only when there is influence from light whose period of variation is relatively long (e.g. influence of daylight on displacement measurement over a long period of time). However it is then ineffective in cases where the light cycles are changing at high-speed. e.g. Flickering Light in the case of electric discharge lamps operated at main power supply frequency.

The main purpose of this invention is to provide a non-contact electro-optical displacement follower, which can move the target image electromagnetically in an optional way to compensate for target movement and re-measure the displaced target by re-adjusting the system quickly and easily.

The invention also enables one to make a non-contact electro-optical displacement follower which displays the relationship between the target and equipment, thus, the conditions of measurement and the field of view.

Moreover the system also allows the taking of high-accuracy measurements, without requiring a particularly high level of skill or intuition.

Most of all, the Light Servo System was devised to allow for the accurate measurement of displacement in situations where there is high-speed changing interference light (such as a series of electrical discharges).

DISCLOSURE OF THE INVENTION

It is the principal of the present invention to provide a non-contact electro-optical displacement follower characterized by the following attributes:
a variable voltage generator for horizontal deflection and/or one for vertical deflection, to provide an image dissector tube equipped with a horizontal deflection coil and/or vertical deflection coil and also to provide the necessary deflection current to move an image of the displaced part under test to an appropriate position for adjustment, or for the displacement measurement to a horizontal and/or vertical deflection coil selectively.

The non-contact electro-optical displacement follower of this invention electrically moves the target image in measuring or adjusting range without having to move the target or camera mechanically, and then easily restores it. Therefore, re-measurement or re-adjustment is easily performed and data with high reliability or repeatability can be obtained.

Another application for this invention is achieved by a non-contact electro-optical displacement follower equipped with the system described in the claim. Various problems which conventional non-contact electro-optical displacement follower posessed can be solved through this invention.

Each construction and its effect are hereinafter described, referring to the attached illustrations of the working examples.

BRIEF DESCRIPTION OF THE DRAWINGS

FIG. 2 shows the state of a field of view of the equipment of this invention.

FIGS. 3 (a), (b), (c) and (d) show the state of a field of view in calibration.

FIGS. 4 (a), (b), (c) and (d) show the state of a field of view combined with the direction on two axes.

FIGS. 5 (a), (b), (c) and (d) show the state of a field of view during measurement.

FIG. 16(a) is a block diagram showing the light servo loop.

FIG. 16 (b) is a block diagram showing an example of a switching control circuit possibly used as a high voltage direct current power supply for a non-contact electro-optical displacement follower of this invention.

FIGS. 17 (a) to (c) are examples of a control voltage waveform by each control.

BEST FORM FOR WORKING OF THE INVENTION

This invention will hereinafter be disclosed, referring to the attached illustration of a working example.

Figure 1:
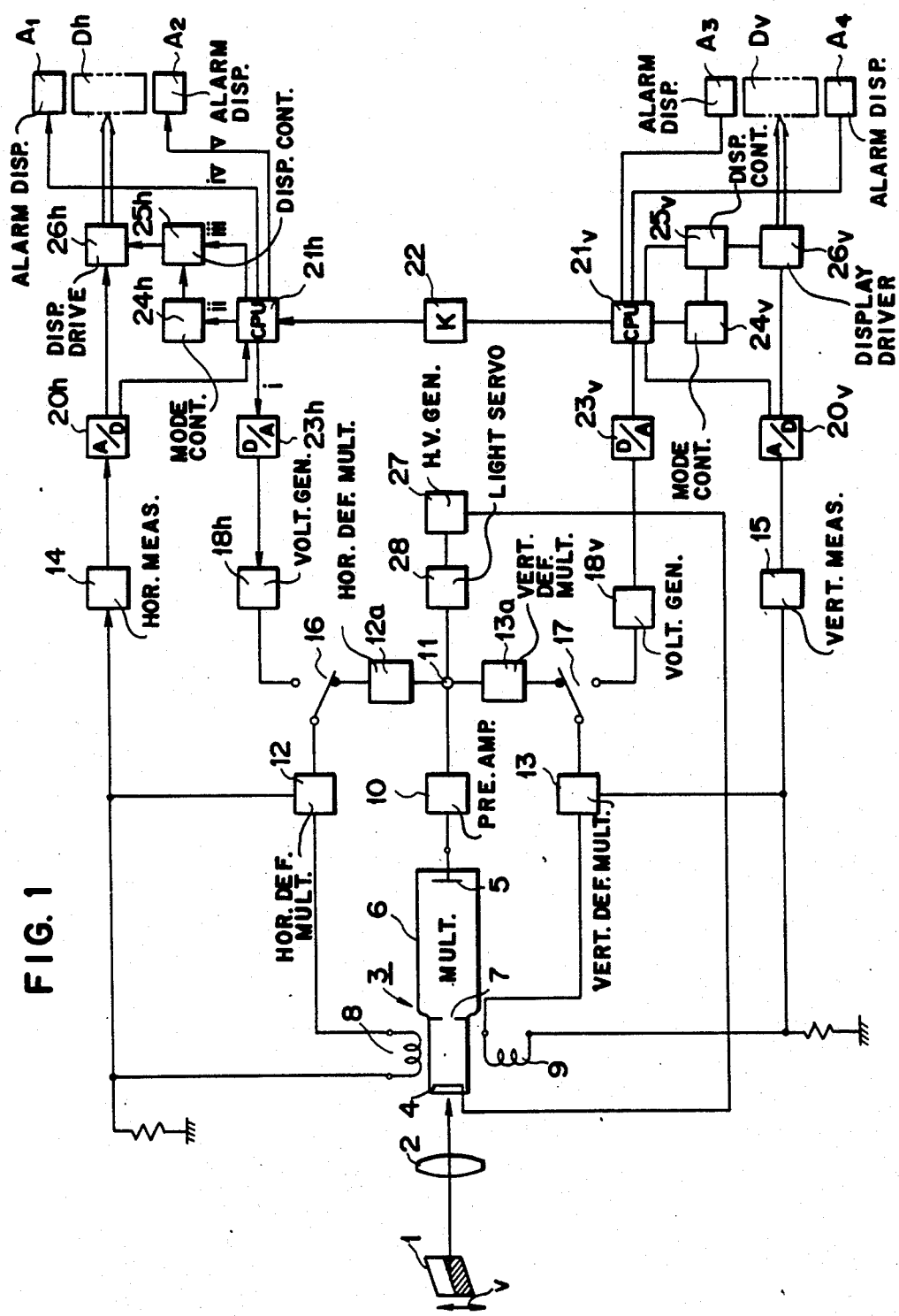
FIG. 1 is a block diagram which shows the entire noncontact electro-optical displacement follower of this invention.

An image of a target 1 which possesses light/dark areas is focused on a photocathode 4 of an image dissector tube 3 through a lens system 2 according to FIG. 1 which shows the structure of a non-contact electro-optical follower of this invention imitating it to an optical system and by a block diagram to an electric system. An image dissector tube 3 is usually abbreviated to "photomul" (abbreviation of photo multiplier) since it possesses an electron multiplying function.

A photocathode 4 of a photo multiplier 3 forms an electron image corresponding to a target 1 on an aperture 7 which is at one end of a multiplier 6. In this case, an appropriate deflection magnetic field is applied to a beam which forms an electron image from a horizontal deflection coil 8 or vertical deflection coil 9. The displacement of a target 1 is measured on the basis of large or small of a deflection output needed to maintain a fixed output level at the anode 5 of multiplier 6, that is to say, to maintain the light/dark ratio of a target electron image on an aperture 7 or a pulse width or phase of an output signal.

A preamp 10, discriminator 11, multipliers for a horizontal deflection 12a and 12, multipliers for a vertical deflection 13a and 13 and a horizontal measurement part 14 and vertical measurement part 15 which provide an output for each deflection may be constructed by using well-known electronic components.

The measurement in the case that a target is placed as shown in FIG. 1 displaces vertically in the direction of arrow V is carried out by perfectly compensating the displacement of the target electron image using vertical deflection coil 9 and also forming a light/dark image on an aperture 7. This relation is performed by a horizontal deflection coil 8 if light/dark boundary of target 1 is v-ertical and displaces in a horizontal direction. Therefore, in calibration the primary purpose of this invention is achieved using the deflection system which is not working with the deflection coil of a displacement direction of a target image since the other deflection system doesn't work during measurement. In short, the equipment of this invention consists of a variable voltage generator for horizontal deflection 18h and one for vertical deflection 18v connected selectively through a switch 16 and 17 to a multiplier for horizontal deflection 12 and one for vertical deflection 13.

Both of these variable voltage generators 18h and 18v make it posssible to apply a set voltage to either multiplier pair 12 or 13 through a switch 16 or 17. As a result the deflection of an electron image of target 1 can be changed by a desired amount and the image is possible separated from a measurement range or restored at any time. Accordingly, when target 1 has to be shifted from the field of view of the equipment, one can get the same effect by deflecting the image without making target 1 or the camera (lens system) shift mechanically or optically. This operation can be carried out completely electrically so it can be performed easily and accurately and there would be no difficulty in re-adjusting and restoring the image.

The output based on an image of light/dark target 1 captured in a photomultiplier in FIG. 1 is applied to a discriminator 11 after performing a level adjustment in preamp 10. The output from a discriminator 11 is applied to a horizontal deflection amplifier 12 or a vertical deflection amplifier 13 through a horizontal detection amplifier 12 or a vertical detection amplifier 13a and then makes each deflection coil 8 or 9 operate. This description is omitted since a circuit of the latter half of the vertical system operates in the same way as the other half of the vertical system in the following explanation.

A proportion of the voltage applied to the horizontal deflection coil 8 is used as an electrical displacement output signal which compensates for the displacement of the target by a horizontal measurement part 14. After this output is converted into digital using an A/D converter 20h, it is sent to an central processing unit CPU 21h. CPU 21h receives the measurement mode and other set-up information from the keyboard 22.

I, The first output of the CPU 21h is applied to a variable voltage generator 18h through D/A converter 23h. The variable voltage generator 18th applies a variable voltage to a horizontal deflection coil 8 by either automatic or manual mode, and it is also capable of forcibly deflecting the electron beam in the photomultiplier to the right or left.

II, the second output of CPU 21h, is applied to a mode controller 24h. The output of this mode controller 24h and III, and the third output of CPU 21h, are applied into a display controller 25h. The output of the display controller 25h is applied to a display driver 26h. The output of the A/D converter 20h is also applied to a display driver 26h, and according to these inputs, the display is displayed on the display Dh. LED or other types of multi segment displays are preferable for the display however center zero moving coil meters could also be used.

CPU 21h produces the fourth and fifth outputs, IV and V, which are connected to alarm displays A1, A2 located on both sides of the display Dh. In addition, as these alarm displays A1, A2, partial elements of the display Dh may be utilized. When the target light/dark boundary is detected by an operating changeable voltage generator 18h, namely when the target deviates from the measurable range, when the relation between setting modes of the keyboard 22 and target is not cooordinated, and in other cases the alarming display output generates and both or either one of the alarming display A1, A2 lights or flickers. Moreover, it can be constructed to give an audible alarm a controllable power supply 27 and light servo control unit 28 are connected to discriminator 11. These blocks are explained in more detail forthwith.

Since all of the devices constituting the block diagrams as shown in FIG. 1 are to be constructed by well-known circuit devices, they have not been described herein.

FIG. 2 shows the limits of the field of view of the equipment of this invention, where the outermost frame A equals 200% of the view. The innermost frame B of solid line is the expected displacement range, which equals 100% of the view. Besides, the target light/dark area should be within the range C of broken line for a horizontal displacement measurement, and should be within the line range D for a vertical displacement measurement. Then the real range of the displacement measurement is within the center circle E.

As for the displacement measurement system which is an object of this invention, the incipient adjustment should be done preceding the measurement by providing each situation of the light/dark of the target for the system. This adjustment is needed in order to equal the measurement condition, and it should be done at each change of the environment situation.

The dark area adjustment is performed by focusing the visible light or infrared light emitted or reflected from the target and blocking the front of the camera. However, keep in mind that the light area adjustment is much more difficult to carry out than the dark area adjustment. This is due to the fact that calibration and adjustment are difficult to carry out, and restoration to the measurement position is complicated.

When using the system of this invention, in order to release the target of which light/dark boundary is within the measurement range E as shown on FIG. 3(a), dark part moves downward like white arrow Pv by applying a fixed voltage from the changeable voltage generator 18v for a horizontal deflection in FIG. 1 to a vertical deflection coil 9, then the adjustable situation (FIG. 3(b)) is attained easily. For further information, both side arrows of the light/dark boundary show displacement direction (hereinafter the same). Likewise, in order to change the fully dark covered measurement range like FIG. 3(c) into adjustable situation like Fig. (d), by applying a fixed voltage from the changeable voltage generator for a horizontal deflection to a horizontal deflection coil 8, the dark part moves to left as shown by the white arrow mark Ph, then the adjustable situation is attained. During this adjustment, mechanical or optical adjustment is not necessary, and this adjustment of operation is done only by an electrical method as mentioned above.

Also, if the vertical deflection and horizontal deflection movements are combined, adjustment of the target image like FIGS. 4(a), (b) can be done by the method explained below.

On the displacement measurement of Fig. (a), (b), since the target image should be within the range E of FIG. 2 when adjusting, the first thing you must do is to move a target image (refer to arrow Pi) by applying a suitable voltage from a variable voltage generator 18h for horizontal deflection to the horizontal deflection coil 8. Then by applying a suitable voltage from a variable voltage generator 18b for vertical deflection to the vertical deflection coil 9, a target image can be moved (refer to arrow pj) (FIG. 4(c)) into the displacement measurement range E of FIG. 2(FIG. 4(d)). By applying voltages from variable voltage generator 18h, 18v to a horizontal deflection coil 8 and a vertical deflection coil 9, simultaneously and continuously adjustment of the target of FIGS. 4(a) and (b) can be easily carried out.

Procedure of displacement measurement used by the system of this invention is mentioned hereunder.

At vertical direction displacement measurement, a target should be within D of FIG. 2. When a target is in the situation shown in FIG. 5(a), measurement is not performed, so a suitable condition for a vertical displacement measurement (FIG. 4(b)) should be attained by applying the proper voltage from a horizontal diflection variable generator 18h, to a horizontal deflection coil 8 which is unused during vertical displacement measurement.

The same procedure should be followed for adjustment and measurement of horizontal displacmeent measurement. For example, in the case that a target image is in the situation shown in FIG. 5(c), suitable conditions for measurement (FIG. 5(d)) is attained by applying a proper voltage from a vertical deflection variable voltage generator 18v to a horizontal deflection coil 9.

Figures 6, 8:
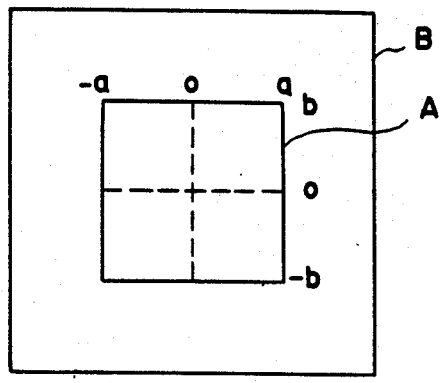
FIG. 6 shows an example of a measuring target where (a) is a target of single axis mode, (b) is one of bi-axial mode and (c) is one of differential mode.
FIG. 8 shows the state of a field of view under the same conditions as FIG. 2.
Figure 7A:
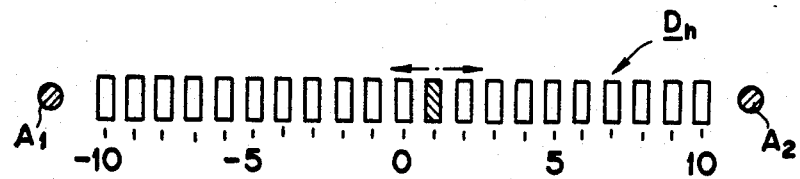
FIGS. 7a–7f show shows examples of the organization of a displayer and an alarm display.
Figure 7B:
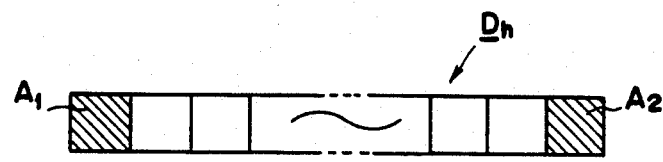
Figure 7C:
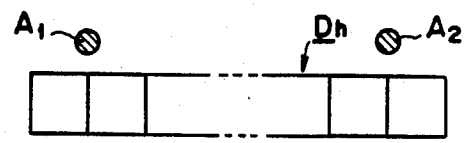
Figure 7D:
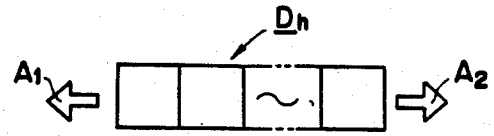
Figure 7E:
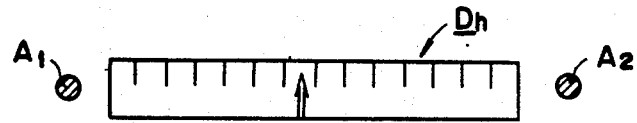
Figure 7F:
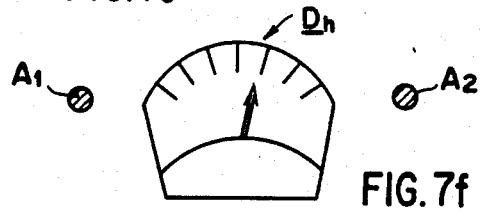

FIG. 6 shows various targets used for a displacement measurement system, and their relation to the measurement modes. Targets are used which can be measured along a single axis mode, thus having a horizontal or vertical light/dark boundary like Fig. (a), along a bi-axis mode having both a horizontal and vertical light-/dark boundary like Fig. (b) to measure bi-axis direction displacement, and along a differential mode to measure width or thickness as in Fig. (c).

FIG. 7 shows a Display Dh(dv) and an Alarm Display A1, A2, (A2, A4). An example of usage of these displays is by adding an alarm display A1, A2 to both ends of a visible display Dh which consists of various LED displays, or by using a part of D. Also, multi-directional meter is available as in Fig. (e), (f). Both horizontal and vertical displays are located on the panel for this type of display as clearly shown by the block diagram of FIG. 1.

FIG. 8 shows the same condition of measurement view as FIG. 2. For displacement measurement, a target light/dark boundary should be within view A, so the relation should be −a x a or −b y b. Also, since an arrangement of light/dark is determined by the system setting mode, and for this it is important to have it correspond to the above mode. As for the system of this invention, an optional deflection toward the double expanded view B and discrimination of the displacement of the target light/dark boundary and its direction are necessary.

Figure 9:
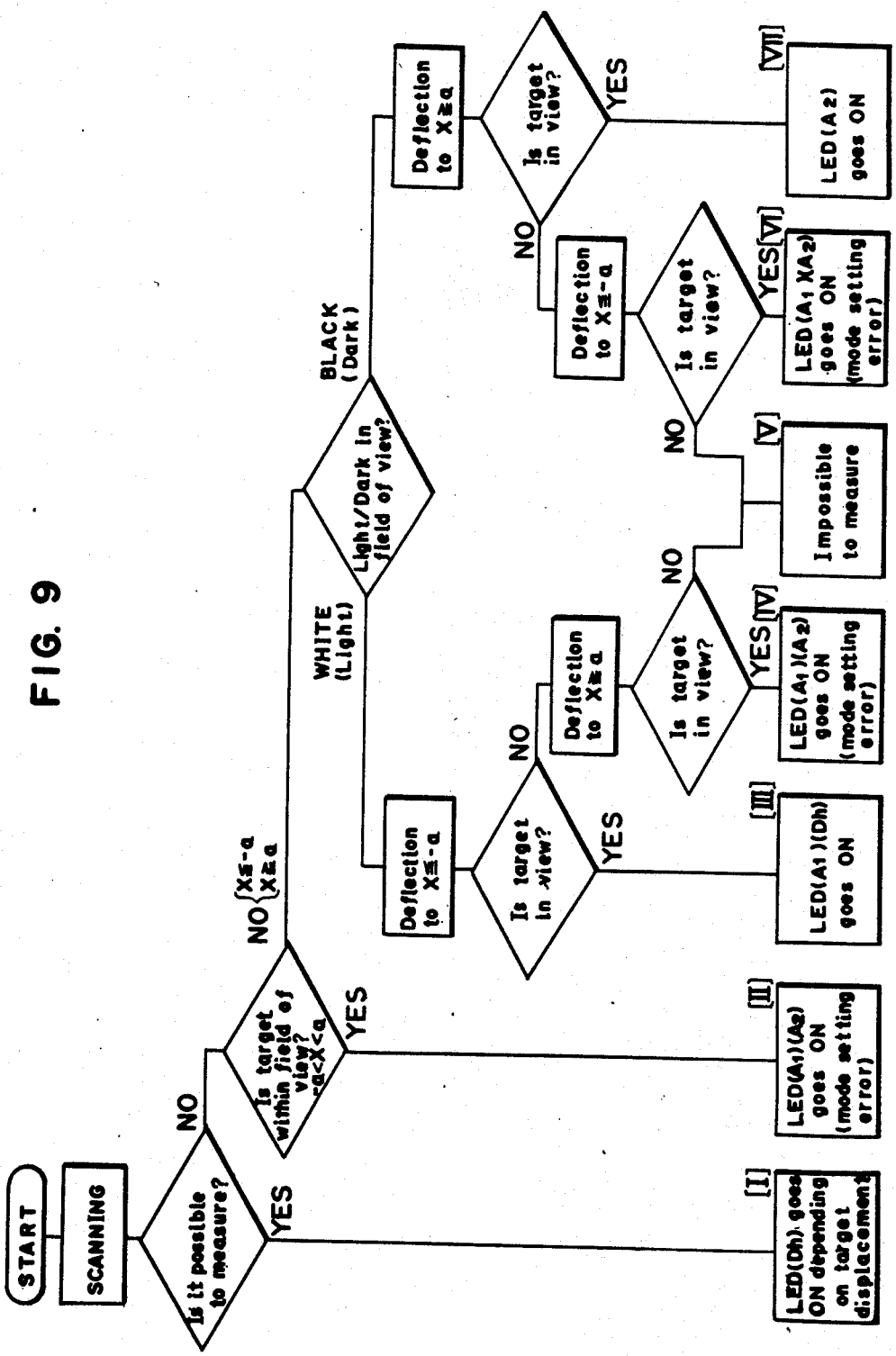
FIG. 9 is a flow chart to show operation for measurement preparation of a non-contact electro-optical displacement follower of this invention.

FIG. 9 is a flow chart showing the initial measurement preparations of the displacement measurement system of this invention. When the system is set on the measurement mode and started, scanning is performed within the optical made-up view. As a result, if an electrical image of a target light/dark direction coincides with a setting mode, the displacement which should be measured is displayed on the Display D (FIG. 9, situation I).

If the measurement is impossible, the undermentioned judgement is carried out continuously. When the measurement is not performed even if a target is within view, it means that the mode setting is not incorrect, and an operator knows by the alarm displays A1 and A2 light or flickering light (Situation II). Measurement will be possible by correcting the mode.

When measurements can not be carried out, and the target light/dark boundary is out of the field of view A, the non-contact electro-optical displacement follower distinguishes white(light) from black(the dark) of the target within the field of view A.

When the target in the field of view is white(light), it determines whether the target light/dark boundary is in the field of view or not by applying the deflection voltage to the deflection coil so that the direction X −a, namely, the left side of the field of view A can be observed. If the target light/dark boundary is detected as a result of the above procedure, this is indicated by either A1 or A2 of an alarm display, (e.g. only A1, lights, which shows the light/dark boundary is in the left side of the field of view A). Also, the display "Dh" lights showing that a light part is in the field of view. Although we have to readjust the sight according to the display, this can easily be done, since the deflection direction is known in advance.

If the target light/dark boundary was not detected through the above operation, the non-contact electro-optical displacement follower decides whether the target light/dark boundary is in field of view or not in the same way, after moving to the right (X a) of the field of view A. If the above boundary is detected, the alarm display A1 and A2 light up, or flash simultaneously showing an error in mode setting (Situation IV). We can subsequently revise and change the mode setting, and then carry out the measurement.

If the target light/dark boundary was not detected through the above procedure, the measurement can not be carried out (situation V) unless the target can be sighted at least within the field of view B, after having readjusted the view.

When the target light/dark boundary is out of the field of view A and at the same time it is black(dark) in the field of view A, the light end direction operation of the flow chart should be carried out. In other words, the deflection current should be supplied to the deflection coil from the changeable voltage generator so that the right side of the field of view A can be observed. If the target light/dark boundary is caught as a result of the above process, only an alarm display A2 lights, showing that the boundary has been shifted to the right (situation VII). The measurement can be carried out by readjusting the sight.

If the target light/dark boundary could not be detected through the above operation, the deflection current should be supplied to the opposite side. If the target is detected as a result of the above procedure, both the alarm displays A1 and A2 light, displaying an error setting mode (situation VI). The measurement can be carried through changing the setting mode.

If the target could not be detected through the operation, re-setting should be performed. This measurement can not be carried out unless the target light/dark boundary is caught in the field of view (situation V).

Displays of impossible measurements such as the status V are easily achieved by making all the display parts light on the condition that each of the above operations has been repeated thoroughly, or by applying other display equipment.

Although the above flow chart only seems to disclose the horizontal direction, i.e. X direction of the field of view, it actually can disclose the vertical direction, i.e. Y direction as well. It is evident that the disclosure of both horizontal and vertical directions would naturally be done simultaneously in the case of a bi-axial or differential measurement.

It is fairly complicated to operate the non-contact electro-optical displacement follower properly, and it requires skill to carry out the displacement measurements with extreme accuracy. It would be convenient if the equipment were supplied with a system to notify the operator of the success of the operation procedure during measurement. This can be achieved by applying the parts (indicated by FIG. 10) of the structure, against the non-contact electro-optical displacement follower OP as indicated by the block diagram shown in FIG. 1.

Figure 11:
FIG. 11 is an example of an object of the device under test corresponding to the differential mode.
Figure 10:
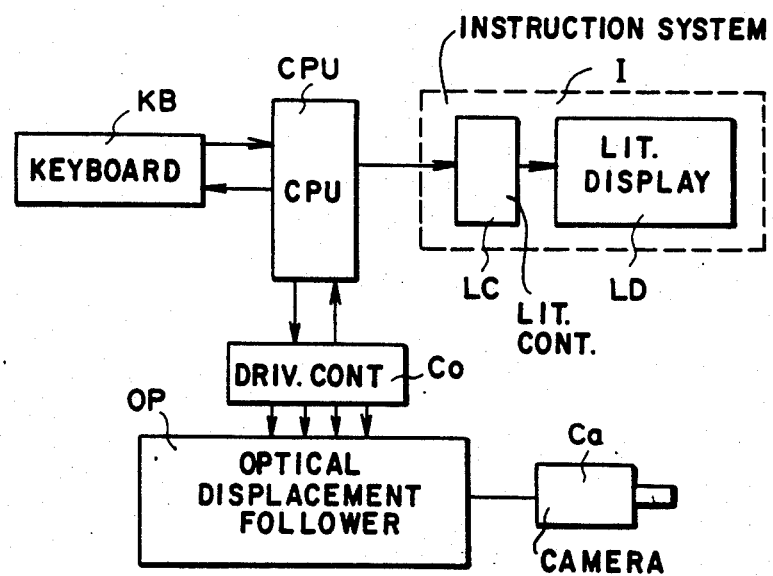
FIG. 10 is a block diagram which shows the structure of a non-contact electo-optical displacement follower which can determine the direction of movement.

The non-contact electro-optical displacement follower whose construction is as indicated in FIG. 10, easily perceives whether or not the device under test is within the measurement mode of the equipment. Thus accurate displacement measurements can be carried out carefully following the display. In other words, the non-contact electro-optical displacement follower possesses a measurement field of view as indicated in FIG. 2. Additionally one measurement mode must be selected from four modes showed in FIG. 3, depending on the device under test. The non-contact electro-optical displacement follower can not perform an appropriate measurement unless it is set to the measurement modes most suitable to the target. e.g. If the device under test is something long like a pipe or wire, etc. which continuously shifts from left to right, as shown in FIG. 11, (2) of the mode between two points in the FIG. 3 have to be selected in order to measure outer diameter continuously. After the mode has been properly set, the adjustment conforming to the measurement condition is performed in succession. This adjustment fully includes adjustment of the lens or filter of the camera part, adjustment of the sight of the target, measurement operation and so on.

Figure 12:
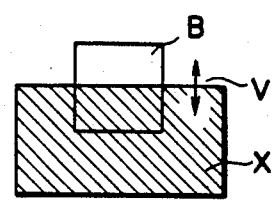
FIG. 12 is an example of an object of the device under test corresponding to a single axis mode.
Figure 13:
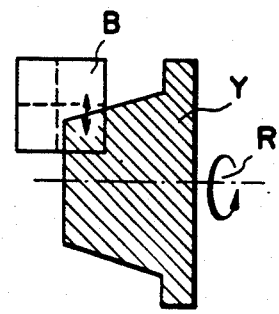
FIG. 13 is an example of an object of the device under test coresponding to a bi-axial mode.

The following are disclosures on the example of the mode setting:

If the non-contact electro-optical displacement follower is used to measure a device under test X which is vibrating like an arrow mark V, thus crossing 100% of the frame of the field of view B, as shown in FIG. 12, or is used to measure a device under test X which is in the shape of an upside down V, or at a 90° angle it is measured in the single axis mode shown the FIG. 3. If it is measuring vibration or distortion of the device under test which is revolving like an arrow mark R, crossing 100% of the frame of field of view B as shown in FIG. 13, it is measured in the bi-axis mode as shown in FIG. 3. If the target produces a light/dark boundary above or below it, or on its right or lift side, the measurement is carried out by differential mode shown in the FIG. 3 as written before. The above measurement mode setting is so important that the satisfactory displacement measurement can not be carried out unless the measurement mode setting is performed appropriately. According to the non-contact electro-optical displacement follower of this invention, mode setting is peformed based on its instruction as one of the operation procedures because the necessary operation is instructed properly in each step equipment setting through measurement.

FIG. 10 is a block diagram which indicates the system of a non-contact electro-optical displacement follower related to this invention. The driving control part "Co" performs a necessary control for the displacement follower mainframe "OP" and a camera "Ca". A keyboard "KB" and operation instruction system "I" are connected toot this central processing unit "CPU". It would be preferable for this keyboard "KB" to be constructed by an ordinary point key or an individual necessary key added the display or an individual key by an illumination switch. This individual key is used, for example, for the mode setting of single axis, bi-axis, differential and so on.

The operation instruction system "I" consists of a literature control part "LC" and literature display "LD" in this operating example. The CRT or LLD is used as a literature display "LD". Sound instruction equipment using an electric vocal frame or sound compounding LSI is used individually or are used together as this operation instruction system "I".

Figure 14:
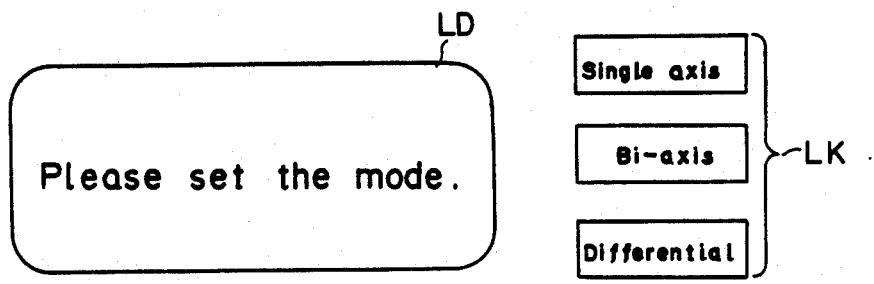
FIG. 14 is a working example of a direction part and selection operation part.

FIG. 14 shows an individual key "LK" for mode setting by an illumination switch as a keyboard "KB" and a literature display "LD". Each type of instruction (message) appears each time on the literature display "LD". What kind of instruction is required on a certain point is indicated after judging through a central processing unit CPU, taking into consideration of the signals obtained through an input from a keyboard "KB" and the equipment itself. An instruction of measurment mode setting appears on an example of FIG. 14. According to this instruction, an individual key "LK" goes on an off. Then you can accordingly operate any of the keys "LK" corresponding to the above target. The key display selected according to this instruction lights continuously while others turn off.

Figure 15:
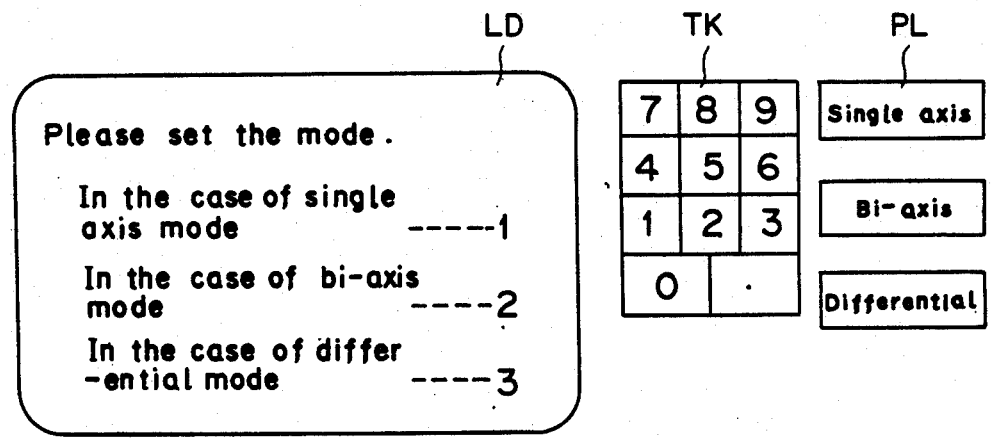
FIG. 15 is the other working example of a direction part and selection part.

FIG. 15 shows an operating example of an combination of a point key "TK" and a display part "PL". On the literature display "LD" an instruction as described in the diagram is given as an example. An appropriate mode setting is carried out through the operating of any of the point keys "TK" according to the instructions. Any of the display parts "PL" light according to this selection and then the current setting mode is indicated.

In the case that the sound instruction equipment is adopted as an instruction system as mentioned above, the content which should be shown on the literature display is indicated by sound. There are no problems if an appropriate key operation is performed just as the above example carried out according to the content. These instructions and operations apply to the other calibration, control and so on. In the non-contact electro-optical displacement follower in this invention, there is possibility that the measurement accuracy will be lowered due to the existence of an external disturbance light as said before, since the displacement measurement is carried out by electrically processing a radiation energy reflected from a target which is the device under test. The so-called LIght Servo circuit is well known as a controller of high voltage applied to a photocathode according to the existence of a disturbance light in order to cover the above fault. However, this Light Servo circuit could not fully follow the high speed external disturbance light over a commercial frequency. The non-contact electro-optical displacement follower in this invention equips the Light Servo circuit whose response has already been improved.

FIG. 16(a) shows the portions of FIG. 1 comprising the light servo loop. It is necessary to have a very faithful target illuminating source to get an accurate and stable measurement. Unfortunately, it is not always possible to have this, especially in outdoor measurements. This problem is solved by the light servo technique of the present invention.

The needed target intensity signal is obtained by sampling the brighter part of the target at regular intervals and at a high speed. This signal is amplified by light servo controller 28 and fed as a controller input to a variable high voltage power source 27. The photocathode by this voltage is so adjusted as to compensate the biasing voltage.

FIG. 16(b) shows an example of high voltage power supply, to generate high, direct voltage needed by an image dissector tube 3, and which is suitable for the non-contact electro-optical displacement follower in this invention while using a switching control. The switching control circuit 31 receives an input 'E1', and the subsequent output is smoothed out after passing through a filter circuit 32, and outputted to overload R. The output E0 is smoothed out by the above procedure. Pressure is distributed by an equal pressure circuit 33, and the output E0 reaches the appropriate voltage. Then after making a comparison between the standard voltage from a standard voltage supplier 34 and an error multiplier, the alteration of an output voltage is detected and given out as output. The output from a pertinent error multiplier is first applied to a control pulse generating circuit 36 and controls a switching control circuit 31 using a pertinent output pulse, by, for example, a pulse width control. It naturally becomes possible to control pulse frequency or pulse amplitude.

The pulse width control controls an output voltage by changing a duty cycle through an increase and decrease of ON time, namely, pulse width, keeping switching frequency fixed. On the other hand, a pulse frequency control keeps either pulse duration time or cessation period fixed, changes the duty cycle through an increase and decrease of the period and controls output voltage. The pulse width control controls an output voltage through a pulse wave height control. FIGS. 17(a), (b) and (c) show respectively an example of an output waveform by each of the above control methods. In each case, the control of output voltage is achieved by the switching circuit 31 via a control pulse generating circuit 36.

Here we would like to consider the operation of a high voltage direct current power supply circuit which uses a switching control of FIG. 16(b), to be applied to a Light Servo circuit. The voltage change obtained through a so called Light Servo system, occurred by the change of incident light from a device under test to an image dissector tube, is added to the output from an equal circuit 33 through a terminal 37 of the circuit FIG. 16(b) and makes an output voltage E0 change through the above operation. The difference in the amount of incident light inserted into this image dissector tube will be effected by the amount of the irradiated light as well as the amount of external disturbance light. When the amount of external disturbance light increases, if the changing period and so on are neglected, the output which was amplified and inverted in a Light Servo circuit 28 applies to FIG. 16(b) terminal 37 after FIG. 1 preamp 10 is amplified. In this case, FIG. 16(b) output voltage E0 is lowered since the voltage applied to terminal 37 is low. This lowered voltage E0 is applied to a photocathode 4 (FIG. 1) of an image dissector tube, so that the sensitivity of an image dissector tube is lowered and as a result operates to erase the change of external disturbance light.

Therefore, the high voltage direct current power source exhibits sufficient compensation effect in such a range as it may have frequency response ability enabling it to follow the amount of light change. However, generally most of the high voltage direct current power supplies used and possess a lower frequency response, and can not follow a commercial frequency or double speed frequency. Thus, if there is disturbance light which changes in high speed when the high voltage direct current power supply is combined with a Light Servo system not only sufficient compensation would not be deserved but also the measurement result would possibly be badly influenced.

This occurs because the fixed voltage direct current power supply circuit, which contains an existing switching regulator, was developed for the purpose of the improvement or miniaturization of the voltage conversion effect. The voltage direct current power supply circuit didn't require a high frequency response in the above application. The idea for the design of this high voltage direct current power supply of this invention differs from the one of the existing power supply circuit, and its primary purpose was to improve the frequency response at the sacrifice of creating other effects. The following are features in some concrete examples:

(1) The stability of a circuit input voltage was considered.

(2) A diode whose switching time is fast and at the same time has small positive direction voltage descent (such as a shot key diode) is used.

Figure 18:
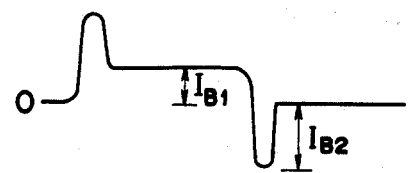
FIG. 18 is an example of a Switching transistor base drive current waveform.
Figure 19:
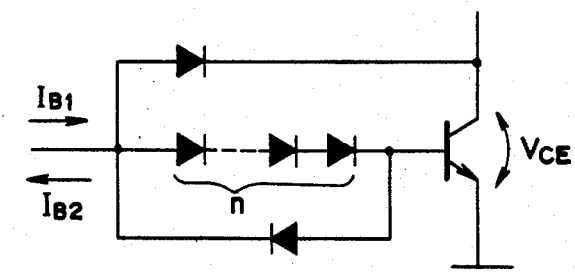
FIG. 19 is an example of a clamping circuit.

(3) A switching transistor which has the following features is adopted.
Saturation voltage is low.
Ht is high.
Tr and tf are fast.
The base currents IB1 and IB2 have the features shown in FIG. 18.
The storage time Tstg is used in the unsaturated state in order to make the time short. The descent time tf is also improved.
The storage time tstg and descent time tf were decreased through the following procedure; a clamping circuit shown in FIG. 19 was connected and especially made "n" over 3 in order to use the Sw transistor in the unsaturated state.

In a circuit of a high voltage direct current power source changed like the above, efficiency was lowered because over drive, the base current and the ON voltage of the collector will be damaged if carried out in the unsaturated state.

-OR-

The value of the collector voltage VCE sat becomes large, however frequency response which is the purpose of this invention had been greatly improved.

Figure 20:
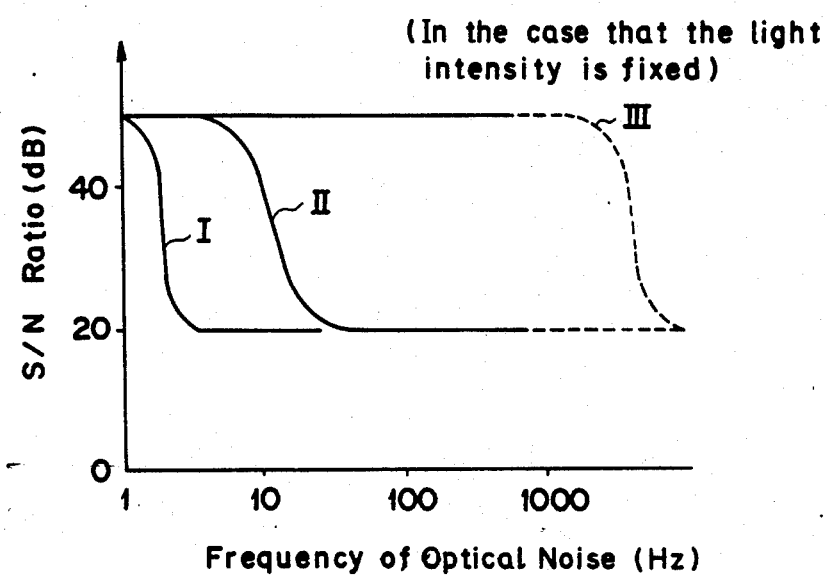
FIG. 20 is a characteristic diagram which shows a comparison of the effects between a non-contact electro-optical displacement follower of this invention and conventional equipment.

FIG. 20 shows the relation between frequency of optical noise and S/N ratio for a non-contact electro-optical displacement follower which doesn't possess a conventional Light Servo circuit (graph I), a non-contact electro-optical displacement follower which possesses a conventional Light Servo circuit (graph II) and a non-contact electro-optical displacement follower which possesses equipment to eliminate optical noise of this invention (Light Servo circuit) (graph III). It is easily realized that influence from optical noise would be greatly eliminated through a non-contact electro-optical displacement follower of this invention.

POSSIBLE AVAILABILITY IN THE INDUSTRY

A non-contact electro-optical displacement follower of this invention makes it possible to measure the amount of thickness, width, length, etc. as well as measure the displacement in each direction, besides accurately measuring under non-contact the displacement of the target which is the device under test.

Also this makes it possible to select a target light-/dark direction centering on the measurement field of view by mode setting. It also makes it possible to very easily confirm whether there is a target light part (or dark part) in a measurable direction, which side, to the right or left (above or below) the center of the measuring field of view target light/dark boundary is in, etc. by means of a visible alarm of flickering light, lighting up or goig off of a lamp on an alarm displayer or panel, or by a sound alarm.

Accordingly, an accurate and appropriate displacement measurement can be carried out without requiring a high level skill or intuition due to the following reason:

The time of initial adjusting and re-adjusting for measurement is reduced since these can be done by witnessing and confirming the above mentioned displays. Precise adjustment and accurate measurement preparation can thus be performed. What's more, appropriate instructions are performed for set-up, initial adjustment and the following revision operation and each opeation is carried out based on these instructions.

It is preferable that after the above instructions are divided into two, namely, instruction which must be performed and those which can be performed optionally each time, depending on necessity they are used properly. As a result, the displacement measurement can be carried out easily under sufficient instructions, avoiding irrelevant operations.

Moreover, a non-contact electro-optical displacement follower equipped with optical noise elimination equipment (Light Servo) makes it possible to perform precise displacement measurements by compensating for interference light changing in high speed. That is to say, precise displacement measurement can possibly be carried out without being badly influenced by fluorescent light, mercury-vapor lamps, discharge lamps, etc., which represent high speed interference light often present. Thanks to these advantages, this non-contact electro-optical displacement follower can be widely used for measurements such as a microscopic displacement, inspection of a factory line, product checks and various measurements for experiments relates to research and development.

What is claimed is:

1. A non-contact electro-optical displacement follower which captures an image of a device under test optically by converting a pertinent optical image into an electron image through an optical-electrical converter and measures its displacement with a displacement follower which is characterized by possesssing an image dissector tube equipped with a horizontal deflection coil and/or a vertical deflection coil, and a variable voltage generator for horizontal deflection and/or a variable voltage generator for vertical deflection to selectively provide necessary deflection current to make the electron image optionally move to an appropriate place for adjustment or displacement measurement; said variable voltage generator for horizontal deflection and/or said variable voltage generator for vertical deflection being variable voltage generators for enlarging the measured field of view and each possessing an operation processing unit which decides the state of a target by receiving a signal displaying the state of said target within an enlarged field of view and a signal displaying a measuring mode set in advance and alarm equipment generating an alarm depending on the matching between deflection direction of a target or a set-up mode and the state of a target in accordance with said operation processing unit.

2. The non-contact electro-optical displacement follower as described in claim 1, characterized in that said alarm equipment is a visible alarm equipment.

3. The non-contact electro-optical displacement follower as described in claim 1, characterized in that said alarm equipment is a sound alarm equipment.

4. The non-contact electro-optical displacement follower as described in claim 1, characterized in that said operation instruction means gives instructions through a display which can auditorily perceive the system setting, construction, adjustment and operation in an appropriate order.

5. The non-contact electro-optical displacement follower as described in claim 1 characterized by having a light servo circuit that applies a high voltage generated by a high voltage power supply to said image dissector tube, the frequency response of said light servo circuit being higher than the commercial frequency.

6. The non-contact electro-optical displacement follower as described in claim 5, characterized by consisting of a switching regulator whose high voltage power source possesses a frequency response higher than the commercial frequency.

7. The non-contact electro-optical displacement follower as described in claim 1, characterized by possessing an instruction system to control each operation required by the system at any point over an entire system as well as the displacement mode.

8. The non-contact electro-optical displacement follower as described in claim 7, characterized in that said instruction means gives instructions through a display which can visually perceive a system setting, construction, adjustment, and operation in the appropriate order.

* * * * *